(12) United States Patent
Suda et al.

(10) Patent No.: US 6,433,675 B1
(45) Date of Patent: *Aug. 13, 2002

(54) RECEIVER FOR ELECTRONIC KEY IN ANTITHEFT DEVICE

(75) Inventors: Kazuhiko Suda; Yasuo Asaga, both of Saitama (JP)

(73) Assignee: Calsonic Kansei Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,492

(22) Filed: Feb. 4, 2000

(51) Int. Cl.[7] ................................. B60Q 1/00
(52) U.S. Cl. ................. 340/425.5; 340/426; 340/427; 340/539; 307/10.2
(58) Field of Search ................. 340/425.5, 426, 340/427, 531, 534, 551, 539, 825.31, 825.34, 5.8, 5.81; 307/10.1, 10.2, 10.5

(56) References Cited

U.S. PATENT DOCUMENTS

| | | | | |
|---|---|---|---|---|
| 5,023,605 A | * | 6/1991 | McColl | 340/825.31 |
| 5,117,097 A | * | 5/1992 | Kimura | 235/439 |
| 5,671,621 A | * | 9/1997 | Watanuki et al. | 70/278 |
| 6,093,980 A | * | 7/2000 | Yamamoto et al. | 307/10.5 |

* cited by examiner

Primary Examiner—Julie Lieu
(74) Attorney, Agent, or Firm—Rothwell, Figg, & Ernst & Manbeck

(57) ABSTRACT

A receiver for an anti-theft device provided in a motor cycle or the like includes a small radius pole 2 which is integrated and extends in the same direction, coaxial direction, on an upper face of a pole 3 provided on a bottom face of a storage case 41 of an electronic circuit board 42. A plurality of protrusions 5 engaged by press fitting with holes provided in the electrical circuit board radiate along a peripheral longitudinal direction of the small radius pole. An electronic circuit board 42 is resin molded in a storage case 41.

10 Claims, 8 Drawing Sheets

RECEIVER FOR ELECTRONIC KEY IN ANTITHEFT DEVICE

BACKGROUND OF THE INVENTION

1. Field of the Invention

The present invention relates to a receiver adapted for use as a support for an electrical circuit board or the like of an electronic cipher key mounted as an anti-theft device in motor cycle for example.

2. Description of the Prior Art

FIG. 9 and FIG. 10 are plan figures of a conventional key cylinder of a motor cycle. In FIG. 9, reference numeral 31 refers to a key cylinder, 32 is a top bridge which is linked to a support 34 which supports a shaft of a tire and a handle shaft 33 from both sides. 44a is a key insertion hole. An engine is stopped by the key cylinder 31 by withdrawing a key 49 from the key insertion hole 44a of the key cylinder 31. Furthermore theft is prevented by locking the steering.

However recently, paralleling the developments in various fields of electronically controlled devices, there has been increasing demand for a motor cycle with a mounted electronically controlled anti-theft device due to demands for improved security. Such a device is envisaged to have an attractive external appearance, high waterproofing, ease of mounting and low cost.

The present invention is proposed to solve the above problems and has the object of providing a receiver with an attractive external appearance, high waterproofing, ease of mounting and low cost.

SUMMARY OF THE INVENTION

A receiver according to the present invention includes an antenna storage section which includes a coil which receives transmitted data from an electronic cipher key, and a circuit storage section extending from said antenna storage section in an intersecting direction with respect to said antenna storage section, said circuit storage section storing a circuit board which processes transmitted data from said coil, said antenna storage section and said circuit storage section being integrated.

A receiver according to the present invention wherein said antenna storage section including a coil which receives transmitted data from an electronic cipher key is disposed in parallel with an inserted face of a key in a key cylinder and extends from said antenna storage section in an intersecting direction with respect to said antenna storage section, and said circuit storage section which stores a circuit board which processes transmitted data from said coil extends in a direction of key insertion, said antenna storage section and said circuit storage section being integrated.

A receiver according to the present invention wherein said antenna storage section and said circuit storage section are exposed.

An antenna storage section of a receiver according to the present invention wherein a hole adapted for insertion of an electronic cipher key is opened and said circuit storage section is provided with a mounting indentation for said circuit board on an inner face. An outer face of said circuit board is formed in a non-indented and non-protruding shape (hereinafter "flat shape").

A hole opened in an antenna storage section of a receiver according to the present invention is formed so that a key insertion face of the vehicle key cylinder is visible.

An antenna storage section of a receiver according to the present invention is disposed on an outer side of a key insertion face of a vehicle key cylinder.

A circuit board stored in a storage antenna section of a receiver according to the present invention is connected to an antenna on a side on which said antenna mounting section is mounted with said circuit storage section and an output harness can be withdrawn from an opposite side to said former side.

A receiver according to the present invention provides a waterproofing means on a withdraw section of said output harness.

A circuit storage section of a receiver according to the present invention is adapted to store a molded circuit board in a mounting indentation provided on an inner face of said circuit storage section.

A receiver according to the present invention includes a plate-shaped resilient member adhered to a face of said mounting indentation storing said circuit board opposite said circuit storage section of said circuit board.

DETAILED DESCRIPTION OF THE PREFERRED EMBODIMENTS

In order to describe the present invention in greater detail, the present invention will be described with reference to the accompanying figures.

Embodiment 1

Figure 1:
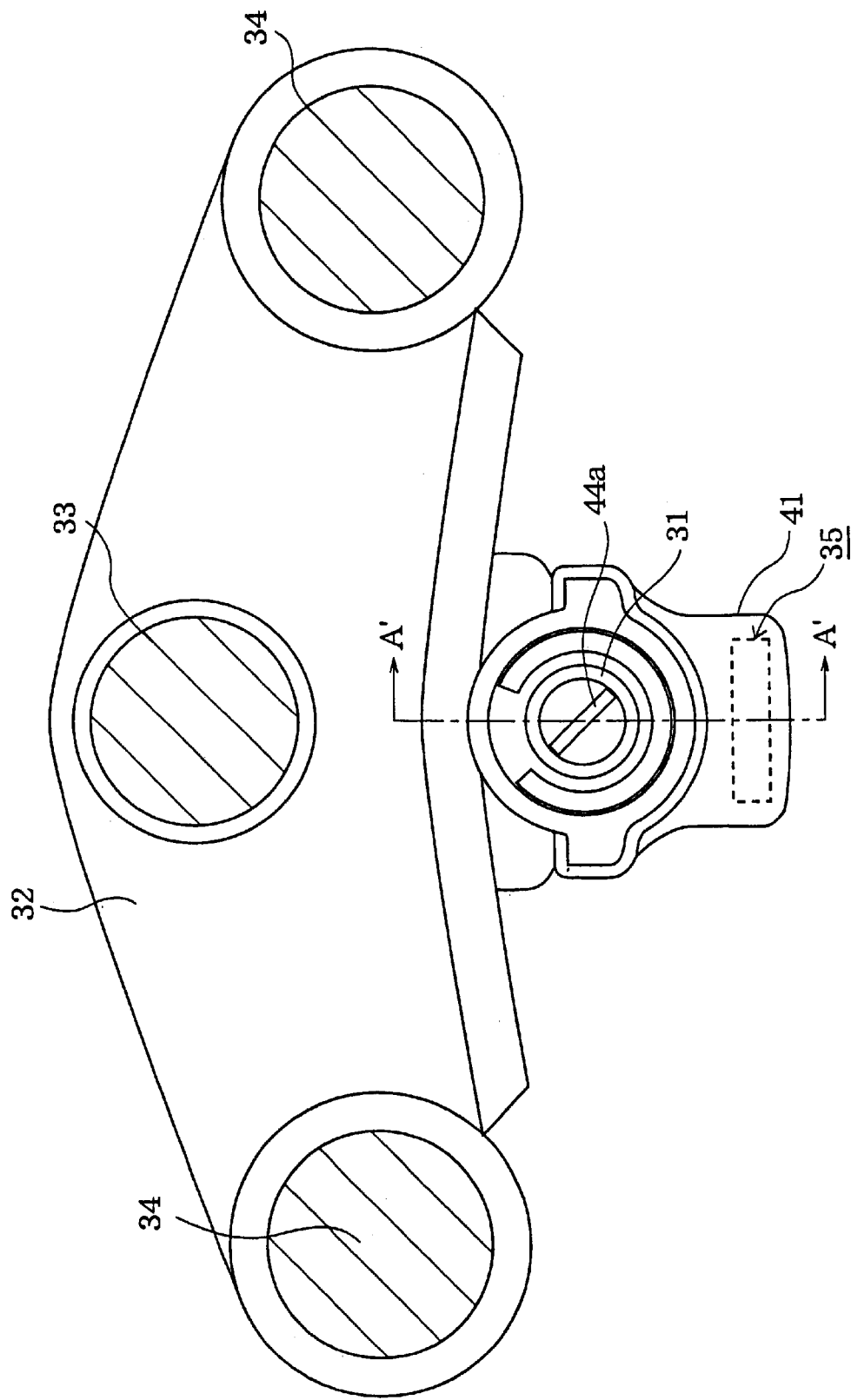
FIG. 1 is a plan figure of a key cylinder of a motor cycle mounting an anti-theft device.
Figure 2:
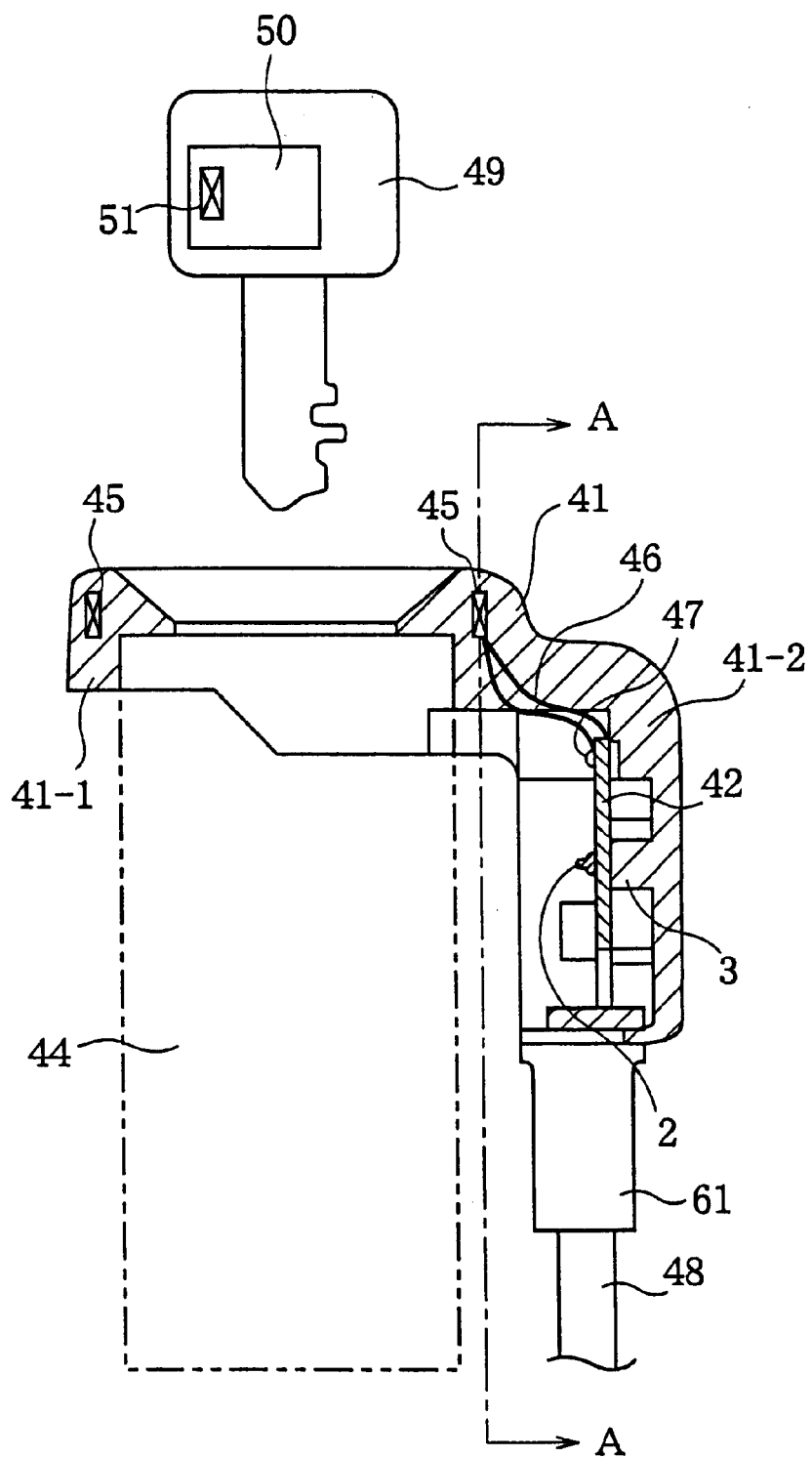
FIG. 2 is a cross sectional figure of a support for an electronic circuit board according to a first embodiment.

FIG. 1 and FIG. 2 show a support for an electronic circuit board in a receiver adapted for use as an anti-theft device for a motor cycle according to a first embodiment. FIG. 1 is a plan figure of a key cylinder of a motor cycle mounting an anti-theft device. FIG. 2 is a cross sectional figure along the line A'—A' in FIG. 1.

Firstly the schematic structure of the device will be described. In FIG. 1, reference numeral 31 denotes a key cylinder, 32 is a top bridge which is linked to the support 34 which supports a handle shaft 33 and a tire shaft from both sides. 35 is a vehicle ID code transceiver of an anti-theft device disposed in an inner section of a storage case 41. 44a is a key insertion hole.

In FIG. 2, 41 is a resinous storage case storing an electronic circuit board 42 of the vehicle ID code transceiver 35. An electronic circuit board 42 is waterproofed by urethane resin (molding agent) (see FIG. 8) which displays excellent adhesive strength with the resin in the mounting indentation of the case (circuit storage section) 41-2. The electronic circuit board 42 is formed in the shape of a letter 'L' from a mounted annular mounting section (antenna storage section) 41-1 and a case section 41-2 on an end of the key insertion hole of the key cylinder 44. The case section 41-2 extends in a direction parallel to a circular peripheral face of the key cylinder 44, that is to say, a direction which intersects with, for example is orthogonal to, the annular mounting section 41-1 and covers a section of that circular peripheral face.

The key insertion face including the key insertion hole 44a of the key cylinder 44 is visible through a hole formed in a central section of the annular mounting section 41-1. A ring-shaped coil 45 for an antenna (discussed below) is disposed on an outer side of the key insertion face. When a key 49 is inserted into the key insertion hole 44a, the ring-shaped coil 45 for an antenna and a coil 51 near the key 49 (forming a section of the transponder) make contact and are electro-magnetically linked.

45 is a ring coil which is buried in a annular mounting section 41-1 of the storage case 41 and is connected to the terminal 47 of the electronic circuit board 42 by a lead line 46. An electronic circuit on the electronic circuit board 42 is connected to a control circuit (not shown) through a harness 48. A bush 61 is provided as a waterproofing means on a withdraw section of the harness 48. An outer face of the annular mounting section 41-1 is exposed to the exterior and thus is formed in a non-protruding or non-indented shape such as a flat shape or circular arc curved face to improve external appearance.

The operation of the present invention will be described below.

When a key 49 is inserted into the key insertion section 44a of the key cylinder 44 and the key 49 is operated, the vehicle ID code transceiver 35 is activated and an electrical current flows in the coil 45. A magnetic field which is generated by the current flowing through the coil 45 induces an electrical force and operates the coil 51 of the key ID code transceiver 50 stored in the key 49. Thus an ID code is transmitted from the key ID code transceiver 50 as a result of the electrical force. The vehicle ID code transceiver 35 checks the ID code on receipt of the ID code. In the event of a match, an engine initiation permission signal is supplied to a control circuit (not shown) though a harness 48.

The electronic circuit board 42 is stored in a case 41-2 covering a section of the peripheral face of the key cylinder 44. In this way, the inner side of the case 41-2 is disposed in a position which is shadowed by the key cylinder 44. Furthermore since the outer side of the case 41-2 (the opposite side to the open side of the case 41-2) faces a direction of travel, seepage of rainwater into the case 41-2 during travel in rainy weather can be prevented by the key cylinder 44 acting as a wall.

Figure 3:
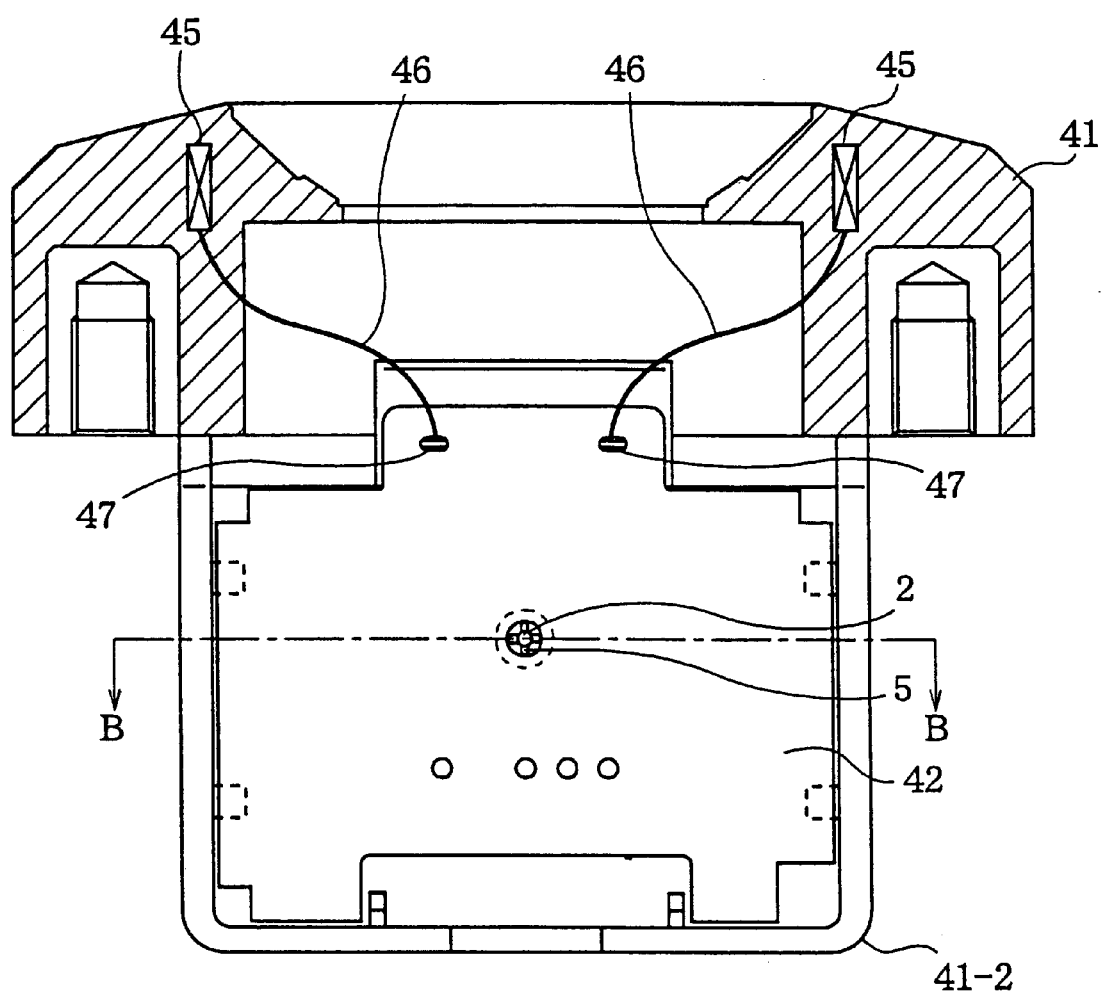
FIG. 3 is an enlarged cross sectional view along the line A—A of FIG. 2.
Figure 4:
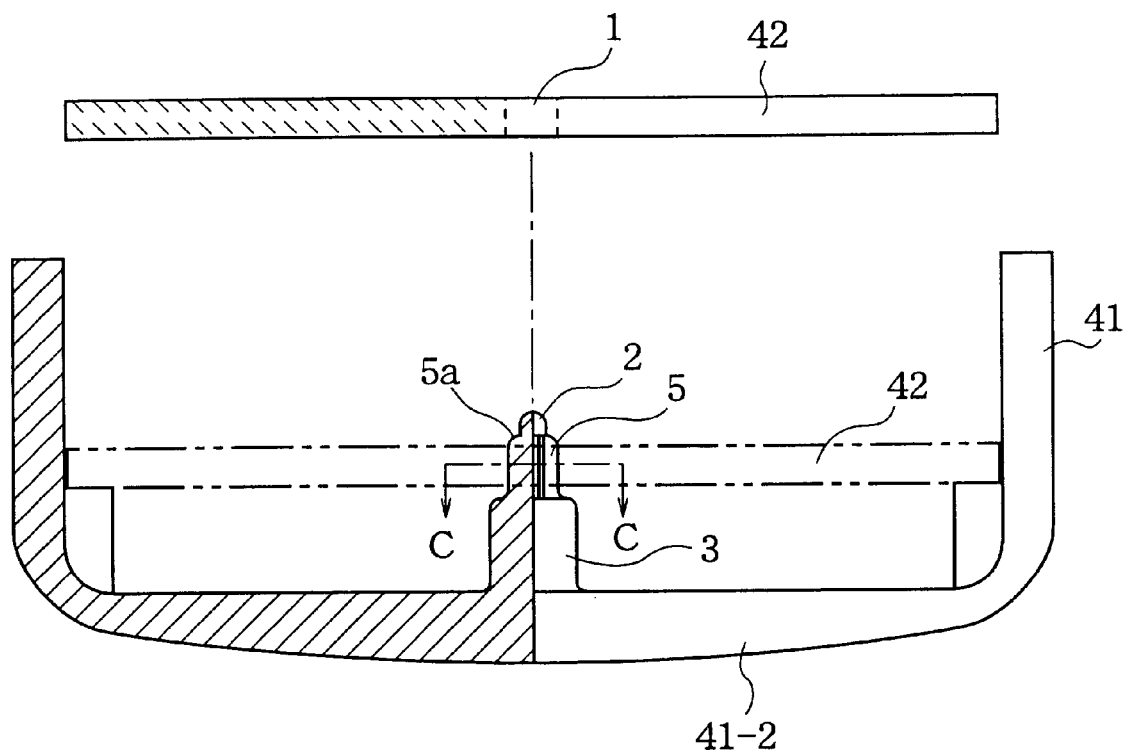
FIG. 4 is an enlarged cross sectional view along the line B—B of FIG. 3.
Figure 5:
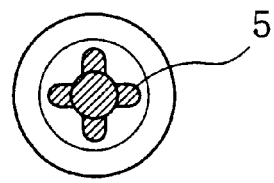
FIG. 5 is a cross sectional view along the line C—C of FIG. 4.

Now the support of the electrical circuit board 42 on the case 41-2 will be described in detail. FIG. 2 is a cross sectional view of a support of an electrical circuit board in a receiver according to a first embodiment. FIG. 3 is an enlarged cross sectional view along the line A—A of FIG. 2. FIG. 4 is an enlarged cross sectional view along the line B—B of FIG. 3. FIG. 5 is an enlarged cross sectional view along the line C—C of FIG. 4. In the figures, 1 is a hole for press fitting an electrical circuit board 42 onto a small radius pole 2. 3 is a pole which is provided on a bottom face of the storage case 41. A small radius pole 2 is integrated and extends in the same direction, coaxial direction on an upper face of the pole 3. A plurality of protrusions 5 engaged by press fitting with the hole 1 of the electrical circuit board 42 radiate along a peripheral longitudinal direction of the small radius pole 2. The tip on the press-fit side of the protrusion 5 is provided with a guide face 5a which is a curved face for guiding press fitting.

The fixation of the electrical circuit board 42 is performed by press fitting a small radius pole 2 into a hole 1 of the electrical circuit board 42 and is supported at a fixed mounting position on the electrical circuit board 42 as shown by the broken line. Since the contact area of the small radius pole 2 and the electrical circuit board 42 is small due to the provision of the plurality of the protrusions 5 on a peripheral face of the small radius pole 2, friction between the small radius pole 2 and the electrical circuit board 42 during press fitting is reduced and thus press fitting is facilitated. A curved surface is formed on the press fitted tip of the protrusion 5 to act as a guide surface 5a. Thus since insertion of the small radius pole 2, which is the inserted section, into the hole 1 of the electrical circuit board 42 is facilitated in this way, the relative positions of all components can be simply determined and friction on the press fitted tip during initiation of press fitting is reduced. Thus it is possible to perform press fitting of the board smoothly.

As shown above with reference to embodiment 1, the provision of a plurality of protrusions 5 radiating in a longitudinal peripheral direction of a small radius pole 2, which is a press fitted section, and the provision of a guide face 5a on the press fitted tip of the protrusion 5 facilitates the press fitting of the board and the positional determination of respective components. Furthermore since the electrical circuit board is resin molded in the storage case, it is possible to support the electrical circuit board with excellent waterproofing.

The example shown in the figure is provided with a tapering hole reach the key insertion face of the cylinder 44 in the mounted annular section 41-1. However if the hole is formed in a cylindrical shape as shown by the broken line, it is possible to dispose the coil 45 shown by the dotted line in proximity to the key and to improve the transmission between the key and antenna.

Embodiment 2

Figure 6:
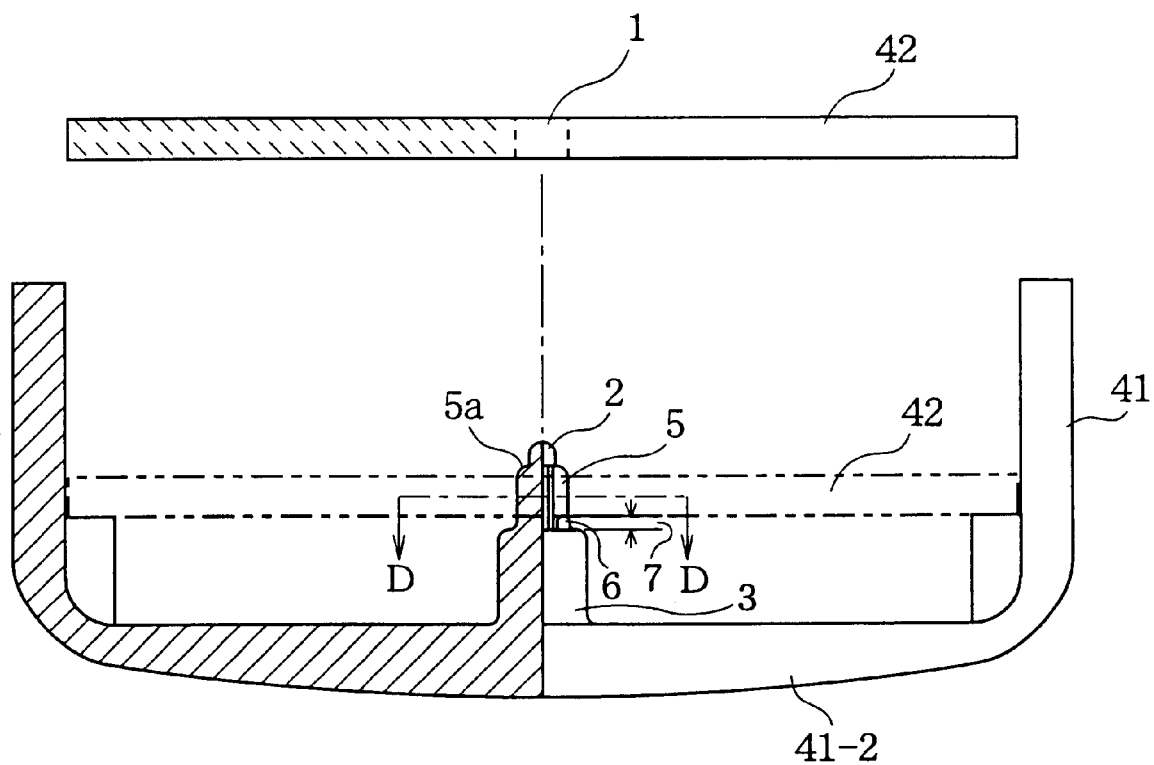
FIG. 6 is an enlarged cross sectional view of FIG. 4 showing the support of an electrical circuit board according to a second embodiment of the present invention.
Figure 7:
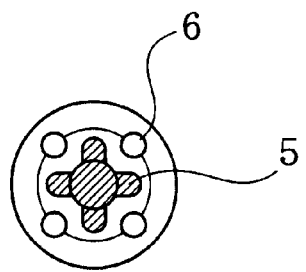
FIG. 7 is a cross sectional view along the line D—D of FIG. 6.

FIG. 6 is an enlarged cross sectional view of FIG. 4 showing the support of an electrical circuit board in a receiver according to a second embodiment of the present invention. FIG. 7 is a cross sectional view along the line D—D in FIG. 6. Components which are the same or similar as those described with respect to embodiment 1 are designated by the same reference numerals and additional description will be omitted. In the figure, 6 denotes a plurality of protrusions provided to surround the small radius pole 2 on an upper face of the pole 3.

Fragments of the electrical circuit board 42 resulting from the press fitting process accumulate between the upper face of the pole 3 and the electrical circuit board 42 in the support of the electrical circuit board according to embodiment 1. Thus the possibility exists of a positional divergence in the mounting position of the electrical circuit board 42. In the invention according to embodiment 2, a gap 7 is formed by a projection 6 between the pole 3 and the electrical circuit board 42 during press fitting by the provision of a gap-forming projection 6 as shown in the figure. Therefore since the fragments formed by the press fitting process accumulate in the gap 7, positional divergences in the mounting position of the electrical circuit board 42 can be prevented. Thus the electrical circuit board 42 can be supported and disposed at a fixed mounting position as shown by the double broken line.

As shown above with reference to embodiment 2, a gap 7 is formed and a plurality of protrusions 6 are provided to surround a small radius pole 2 on an upper face of a pole 3. Thus fragments resulting from a press fitting process of the electrical circuit board 42 accumulate in this gap which enables the prevention of positional divergences in the mounting position of the electrical circuit board 42 due to such fragments.

Embodiment 3

Figure 8:
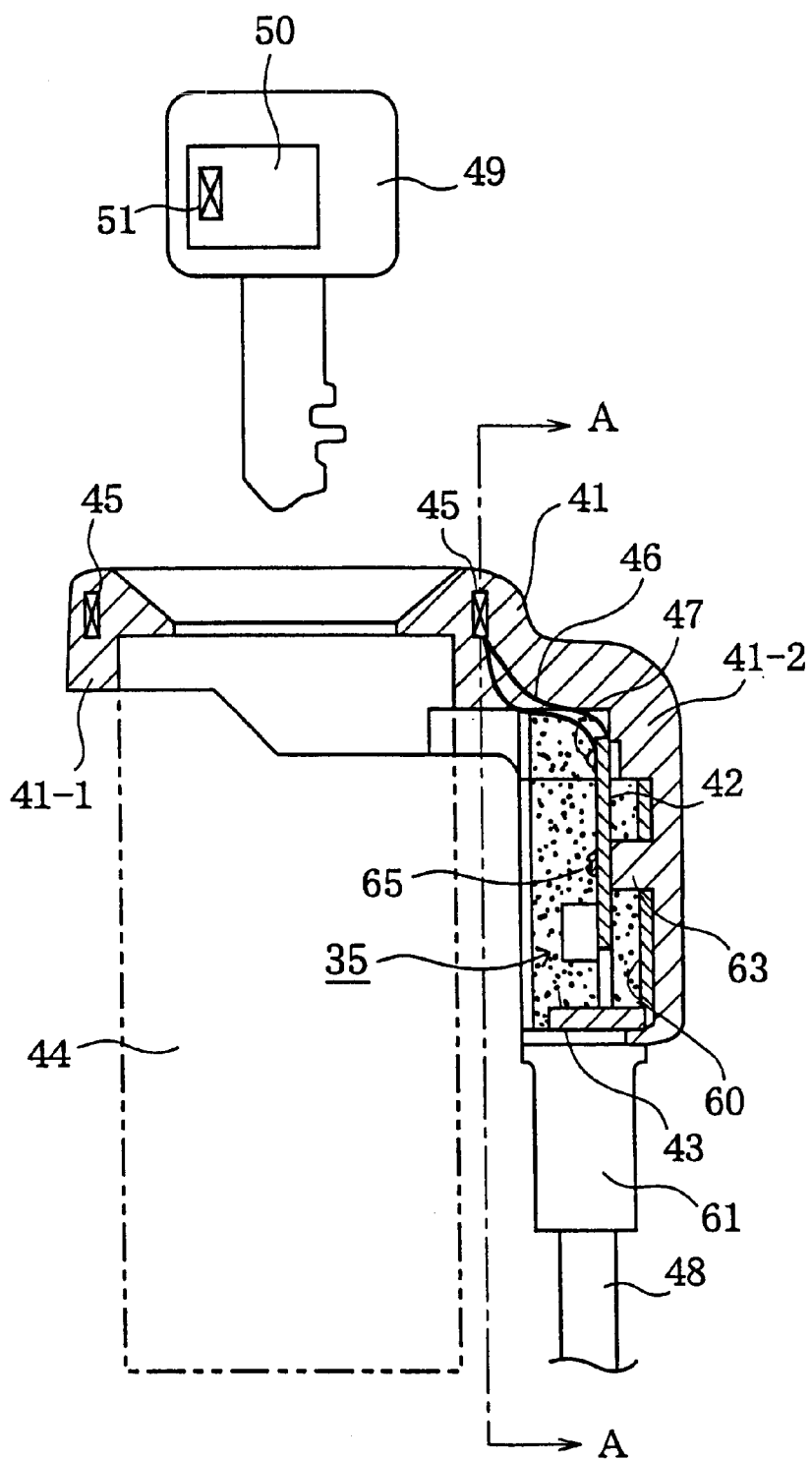
FIG. 8 is a cross sectional view of the support of an electrical circuit board according to a third embodiment of the present invention.
Figure 9:
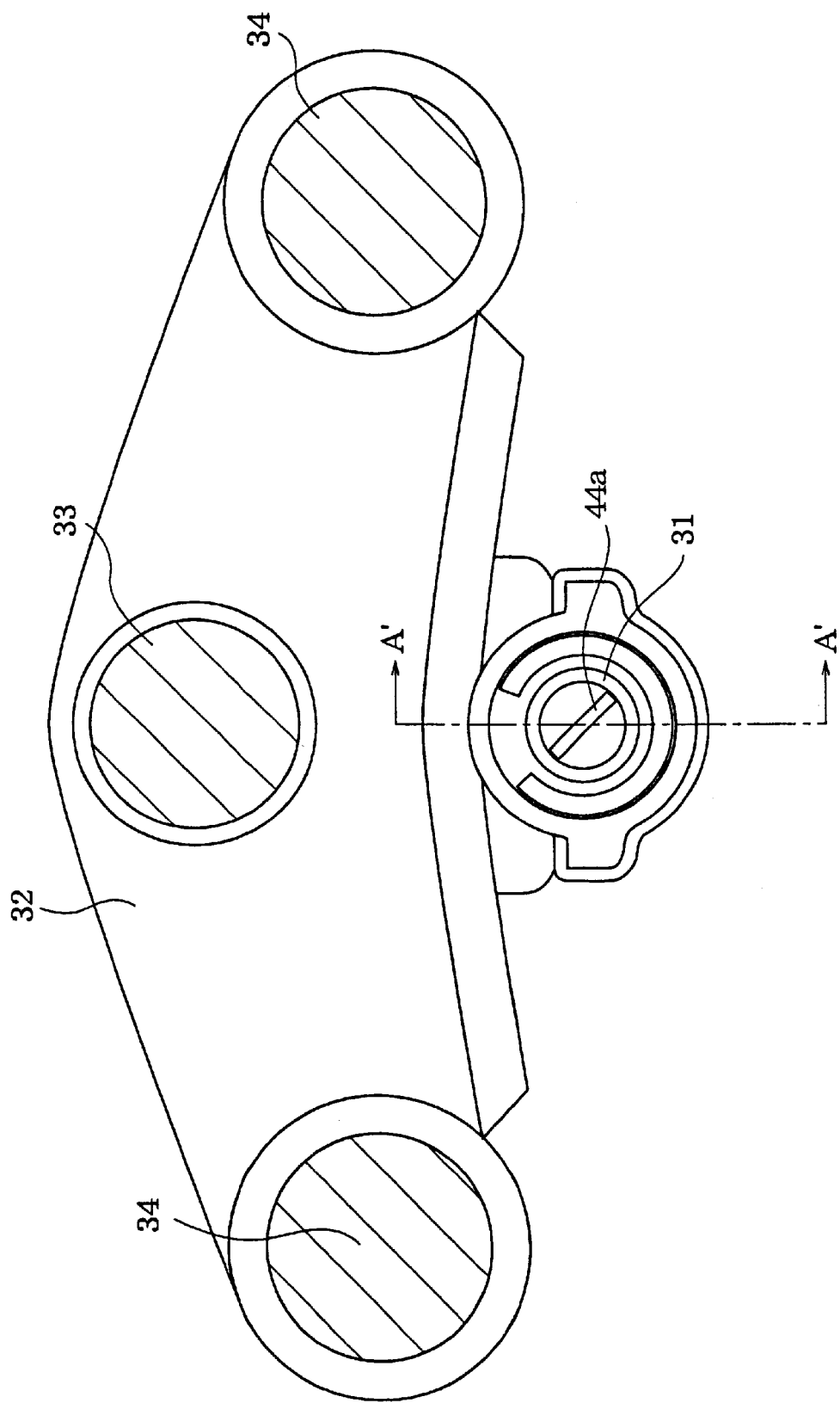
FIG. 9 is a plan view of a conventional key cylinder section for a motor cycle.
Figure 10:
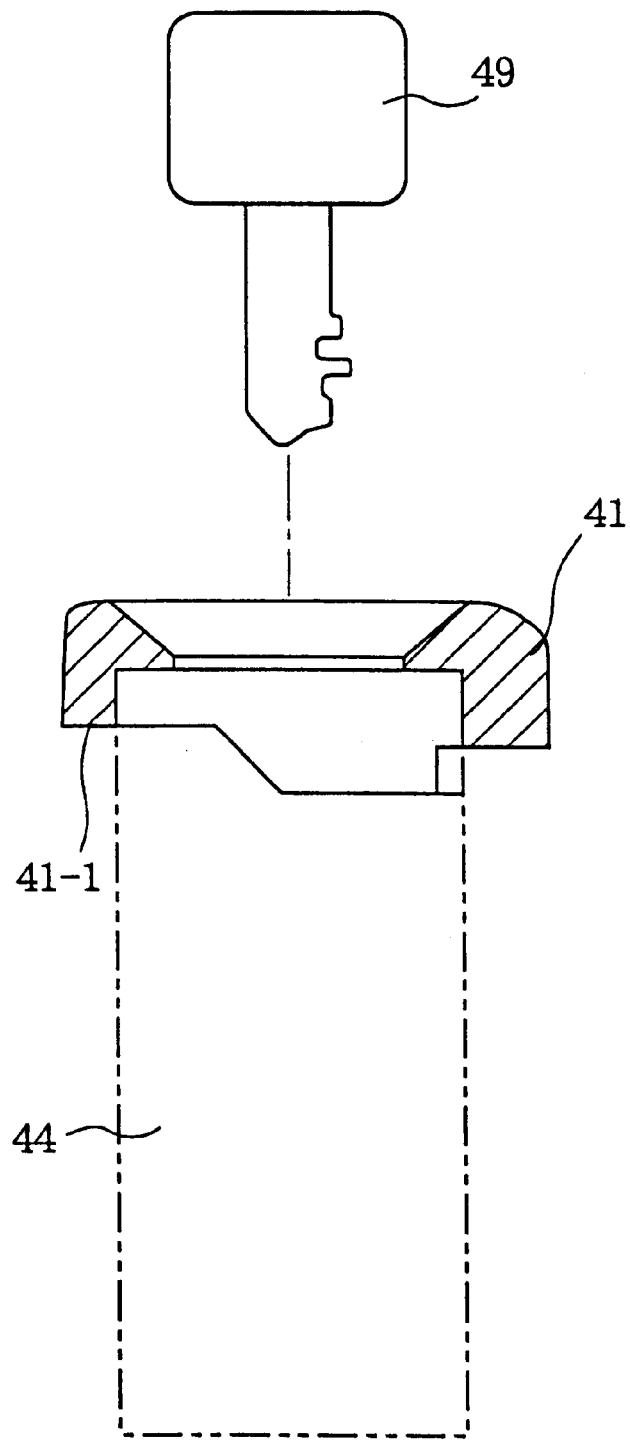
FIG. 10 is a longitudinal cross section along line A'—A' of FIG. 9.

FIG. 8 is a cross sectional view of the support of an electrical circuit board in a receiver according to a third embodiment of the present invention. 60 is a sheet-shaped resilient member (plate-shaped resilient member) made from urethane resin. The resilient member 60 is adhered to a bottom wall of the case 41-2 and is covered by a molding agent 43. In such a way, a pressing force resulting from the thermal expansion of the molding agent 43 is applied to the sheet-shaped resilient member 60 and is absorbed by contraction. The sheet-shaped resilient member 60 may be formed from foam or in a plate shape, that is to say, in the shape of a sheet with a large thickness.

The sheet-shaped resilient member 60 rises due to the buoyancy created by the molding agent 43 which is made from low viscosity and extremely low weight urethane resin is poured into the storage case 41. Thus the sheet-shaped resilient member 60 does not abut with the bottom face of the electronic circuit board 42. Therefore after the sheet-shaped resilient member 60 made from urethane resin is adhered to the bottom wall 41-3 of the storage case 41 in the same manner as above in order to be fixed to a fixed position, the molding agent 43 is poured.

In this way, when the molding agent 43 of urethane resin expands, since resilient force of the sheet-shaped resilient member 60 made from urethane resin is weak in comparison to the force of fixation of the electronic circuit board 42 fixed by a single screw 65, the increase in volume, even in the event that the molding agent 43 undergoes thermal expansion, is absorbed by the resilient force of the sheet-shaped resilient member 60 made from urethane resin. Thus the force pressing the electronic circuit board 42 upwardly is reduced and cracks are not formed in the electronic circuit board 42. It is noted that when the ambient temperature is cyclically varied between 80 to 40 degrees C, defective products are reduced to 0% in comparison to 10% in the prior art.

In the present embodiment, a peripheral face of a hole formed in a center of the annular mounting section 41-1 is formed in a tapering shape. However the radius of the coil 45 can be reduced by the formation of a straight hole formed without a taper. Thus it is possible to improve electromagnetic connection by the disposition of the coil 51 of the key 49 in proximity to the coil 45.

As shown above, the present invention integrates an antenna storage section including a coil which receives transmitted data from an electronic cipher key and a circuit board section which stores a circuit board performing processing of received data form the coil and which is provided on a wall surface which extends in an intersecting direction from the antenna storage section. Thus it is possible to form the overall unit in the shape of a letter "L" and allow compact assembly.

According to the present invention, an antenna storage section and a circuit board section are integrated. The antenna storage section is formed parallel to an insertion face of a key in the key cylinder. The circuit storage section extends in a direction of key insertion. Thus the advantage is obtained that it is possible to mount a key appropriately in the key cylinder.

According to the present invention, since the antenna storage section and the circuit storage section are exposed, it is possible to freely select a mounting position.

According to the present invention, the antenna storage section is provided with a hole into which an electronic cipher key is inserted, and the circuit storage section is provided with an indentation for insertion of the circuit board onto an inner face. An outer face is formed in a flat shape. Thus it is possible to ensure an attractive outer appearance.

According to the present invention, the hole opened in the antenna storage section is formed so that the key insertion face of the vehicle key cylinder is visible. Thus the key cylinder has an attractive outer appearance and may be mounted compactly.

According to the present invention, the antenna storage section is positioned on an outer side of the key insertion face of the vehicle key cylinder. Thus electromagnetic connection of the coils is improved and current flow between the antenna and the key is improved.

According to the present invention, the circuit board stored in the circuit board storage section is connected to an antenna on the mounted side of the antenna storage section with the circuit storage section. An output harness is withdrawn from the side opposite to the mounted side. Thus the output harness is positioned in a hidden position and can not be seen from above thus ensuring an attractive outer appearance.

According to the present invention, since the withdraw section of the output harness is waterproofed, seepage of rainwater through the output harness is can be prevented.

According to the present invention, since the circuit storage section stores a molded circuit board in the insertion indentation provided on an inner face, waterproofing of the circuit board is ensured.

According to the present invention, since a plate-shaped resilient member is adhered to an opposite face to the circuit board of the circuit storage section, bending stress applied to the circuit board is reduced and it is possible to protect the circuit board from bending stress and thus ensure prevention of crack formation and the like in the circuit board.

What is claimed is:

1. A receiver, including:
    a storage case formed of a single piece of molded material, including
        an antenna storage section which is mountable on an end of a key cylinder over a front face of said key cylinder, said antenna storage section including a coil which receives transmitted data from an electronic cipher key, and
        a circuit storage section extending from said antenna storage section in an orthogonal direction with respect to said antenna storage section, said circuit storage section storing a circuit board which processes transmitted data from said coil, said circuit storage section extending in a cylindrical direction along said key cylinder and being open at a side thereof adjacent to said key cylinder such that said circuit board is stored therein with a surface of said circuit board facing a surface of said key cylinder, wherein said circuit board is protected by the surface of said key cylinder.

2. A receiver according to claim 1, wherein said antenna storage section is disposed in parallel with an inserted face of a key in said key cylinder and extends across said front face of said key cylinder, and said circuit storage section which stores said circuit board which processes transmitted data from said coil extends in a direction of key insertion.

3. A receiver according to claim 1 wherein said antenna storage section and said circuit storage section are exposed.

4. A receiver according to claim 1, wherein said antenna storage section has a hole adapted for insertion of said electronic cipher key, and said circuit storage section is provided with a mounting indentation for said circuit board on an inner face thereof, and an outer surface of said circuit board is of a non-indented and non-protruding shape.

5. A receiver according to claim 3 wherein a hole opened in said antenna storage section is formed so that a key insertion face of a vehicle key cylinder is visible.

6. A receiver according to claim 1 wherein an antenna of said antenna storage section is disposed on an outer side of a key insertion face of said vehicle key cylinder.

7. A receiver according to claim 1, wherein said circuit board stored said circuit storage section of said receiver is connected to an antenna on a first side on which said antenna storage section is mounted with said circuit storage section, and an output harness can be withdrawn from a second side which is opposite to said first side.

8. A receiver according to claim 7 wherein a waterproofing means is provided on a withdraw section of said output harness.

9. A receiver according to claim 1 wherein said circuit storage section of said receiver is adapted to store a molded circuit board in a mounting indentation provided on an inner face of said circuit storage section.

10. A receiver according to claim 9 includes a plate-shaped resilient member adhered to a face of said mounting indentation, which stores said circuit board, opposite said circuit storage section of said circuit board.

\* \* \* \* \*